United States Patent
Ichiba et al.

(10) Patent No.: US 6,216,827 B1
(45) Date of Patent: *Apr. 17, 2001

(54) DISC BRAKE ROTOR WHICH GENERATES VIBRATION HAVING A LARGE COMPONENT IN A DIRECTION OF A ROTATIONAL AXIS OF THE DISC BRAKE ROTOR

(75) Inventors: Yasuaki Ichiba, Susono; Naoki Tanabe; Yasushi Hayakawa, both of Toyota, all of (JP)

(73) Assignees: Toyota Jidosha Kabushiki Kaisha; Aisin Takaoka Co., Ltd., both of Toyota (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/893,254

(22) Filed: Jul. 16, 1997

(30) Foreign Application Priority Data

Jul. 24, 1996 (JP) .................................................. 8-195025
Jul. 2, 1997 (JP) .................................................. 9-177103

(51) Int. Cl.$^7$ ................................................ F16D 65/10
(52) U.S. Cl. .................................. 188/218 XL; 188/73.2
(58) Field of Search ..................... 188/218 XL, 70 R, 188/250 E, 264 A, 73.1, 264 AA, 264 R, 73.37, 73.2

(56) References Cited

U.S. PATENT DOCUMENTS

| | | | |
|---|---|---|---|
| 3,378,114 | 4/1968 | Hollins | 188/218 XL |
| 4,745,996 | * 5/1988 | Wirth | 188/218 XL |
| 4,809,827 | * 3/1989 | Suzuki | 188/218 XL |
| 4,995,484 | * 2/1991 | Kadel | 188/70 R |
| 5,385,216 | * 1/1995 | Kulczycki | 188/70 R |
| 5,460,249 | * 10/1995 | Aoki | 188/218 XL |
| 5,480,007 | * 1/1996 | Hartford | 188/218 XL |
| 5,492,205 | * 2/1996 | Zhang | 188/218 XL |
| 5,526,905 | * 6/1996 | Shimazu et al. | 188/218 XL |
| 5,765,667 | * 6/1998 | Ross et al. | 188/218 XL |
| 5,823,303 | * 10/1998 | Schwarz et al. | 188/218 XL |

FOREIGN PATENT DOCUMENTS

| | | | |
|---|---|---|---|
| 68 12 789 | 4/1969 | (DE) . | |
| 69 46 818 | 12/1969 | (DE) . | |
| 33 35 807 A1 | 4/1985 | (DE) . | |
| 87 09 406 | 10/1987 | (DE) . | |
| 38 35 637 A1 | 4/1990 | (DE) . | |
| 0 524 521 | * 1/1993 | (EP) | 188/218 XL |
| 2 070 164 | 9/1981 | (GB) . | |
| 2 076 090 | * 11/1981 | (GB) | 188/218 XL |
| 2 239 685 | 7/1991 | (GB) . | |
| 2 239 685 | * 10/1991 | (GB) | 188/218 XL |
| 59-63238 | 4/1984 | (JP) . | |
| 1-285453 | * 11/1989 | (JP) | 188/218 XL |

* cited by examiner

Primary Examiner—Matthew C. Graham
Assistant Examiner—Thomas J. Williams
(74) Attorney, Agent, or Firm—Oliff & Berridge, PLC

(57) ABSTRACT

A disc rotor used in a disc brake which generates a vibration having a large component in the axial direction of the disc rotor when a brake pad is pressed against the disc rotor. The disc rotor has a hat portion to be fixed to an axle hub of a vehicle. A sliding portion, which is pressed by a brake pad so as to generate a brake force, is connected to the hat portion via a connecting portion. A plurality of ribs are provided to increase a rigidity of the connecting portion. A low-rigidity portion having a rigidity less than the sliding portion and the connecting portion may be provided between the sliding portion and the connecting portion.

6 Claims, 12 Drawing Sheets

DISC BRAKE ROTOR WHICH GENERATES VIBRATION HAVING A LARGE COMPONENT IN A DIRECTION OF A ROTATIONAL AXIS OF THE DISC BRAKE ROTOR

BACKGROUND OF THE INVENTION

1. Field of the Invention

The present invention relates to a disc rotor for a disc brake and, more particularly, to a disc rotor suitable for a disc brake apparatus for a vehicle.

2. Description of the Related Art

Japanese Laid-Open Utility Model Application No. 59-63238 discloses a disc brake apparatus. The disc brake apparatus disclosed in this patent document comprises a disc rotor rotating with a wheel, a pair of brake pads provided on opposite sides of the rotor, and a caliper supporting the brake pads. The disc rotor includes a hat portion which is fixed to an axle hub connected to a vehicle body via a bearing. Additionally, the disc rotor includes an annular sliding portion on the outer circumference of the hat portion. When a depression force is applied to a brake pedal, the caliper moves the brake pads toward the disc rotor in response to the depression force. As a result, the brake pads are pressed against a slide portion of the disc rotor in response to the depression force.

When the brake pads are pressed against the rotor, a frictional force is generated between the disc rotor and the brake pads. The frictional force acts as a force to restrict the rotation of the disc rotor, that is, a brake force for restricting the rotation of the wheel. Thus, the disc brake apparatus generates the brake force in response to the depression force applied to the brake pedal.

When a brake force is generated by the brake pads being pressed against the disc rotor, vibration is generated in the disc brake due to the sliding of the brake pads on the disc rotor. In such a case, a compressional wave which transmits in a circumferential direction in an annular sliding portion of the disc rotor is generated. Hereinafter, this vibration is referred to as in-plane vibration. Additionally, axial direction vibration is also generated which periodically displaces each portion of the disc rotor in the axial direction. When the frequency of the vibrations matches the natural frequency of the brake system, a so-called brake noise is generated.

If the vibration generated in the disc rotor can be efficiently attenuated, a disc brake having less brake noise can be achieved. Since the in-plane vibration of the disc rotor transmits to the sliding plane of the disc rotor, the in-plane vibration hardly transmits to the caliper. On the other hand, the axial direction vibration is easily transmitted to the caliper since the direction of transmission of the axial direction vibration matches the direction of movement of the caliper.

The vibration generated in the rotor is further attenuated as the vibration is transmitted to a heavier material such as the caliper. Accordingly, as far as reduction of the brake noise is concerned, it is preferred that the vibration, which is generated in the rotor due to the brake pads being pressed against the disc rotor, has a large component in the axial direction. However, in the conventional disc rotor, no measures have been taken to generate the vibration having a large component in the axial direction.

SUMMARY OF THE INVENTION

It is a general object of the present invention to provide an improved and useful disc rotor of a disc brake in which the above-mentioned problems are eliminated.

A more specific object of the present invention is to provide a disc rotor used in a disc brake which generates vibration having a large component in the axial direction of the disc rotor when a brake pad is pressed against the disc rotor.

In order to achieve the above-mentioned objects, there is provided according to one aspect of the present invention a disc rotor of a disc brake for a vehicle, comprising:
  a hat portion adapted to be fixed to an axle hub of the vehicle;
  a sliding portion adapted to be pressed by a brake pad so as to generate a brake force;
  a connecting portion connecting the sliding portion to the hat portion; and
  a plurality of ribs for increasing rigidity of the connecting portion.

According to the above-mentioned invention, since the ribs are provided to the connecting portion so as to increase the rigidity of the connecting portion between the sliding portion and the hat portion, the vibration generated in the disc rotor due to the brake pad being pressed against the sliding portion has a large component in the direction of the rotational axis of the disc rotor. Accordingly, the vibration generated in the disc rotor tends to be transmitted to a caliper pressing the brake pad onto the disc rotor. This substantially increases a mass of the brake system and, thus, the generation of a brake noise is suppressed.

In one embodiment of the present invention, the ribs may be provided to the connecting portion. Additionally, each of the ribs may extend in a radial direction of the disc rotor. Further, each of the ribs may be integral with a fin provided in the disc rotor, the fin extending in a radial direction of the disc rotor.

Additionally, a height of each of the ribs may be decreased toward an inner side of the disc rotor, the height measured in a direction of a rotational axis of the disc rotor.

In one embodiment according to the present invention, the ribs may be provided to an outer surface of the hat portion so that an end of each of the ribs is connected to the connecting portion. Additionally, the ribs may be integral with the hat portion and the connecting portion. Further, each of the ribs may extend in a direction of a rotational axis of the disc rotor. Further, a height of each of the ribs may be increased toward the connecting portion, the height measured in a radial direction of the disc rotor.

In one embodiment according to the present invention, each of the ribs may include a first portion provided to the connecting portion and a second portion provided to an inner surface of the hat portion, the first portion extending in a radial direction of the disc rotor, the second portion extending in a direction of a rotational axis of the disc rotor, the first portion and the second portion being integral with each other.

Additionally, there is provided according to another aspect of the present invention a disc rotor of a disc brake for a vehicle, comprising:
  a hat portion adapted to be fixed to an axle hub of a vehicle;
  a sliding portion adapted to be pressed by a brake pad so as to generate a brake force;
  a connecting portion connecting the sliding portion to the hat portion; and
  a low-rigidity portion provided along a substantial boundary between the sliding portion and the connecting portion, the low-rigidity portion having a rigidity lower than a rigidity of each of the sliding portion and the connecting portion.

According to the above-mentioned invention, the low-rigidity portion is provided between the sliding portion and the connecting portion. The low-rigidity portion is more flexible than the sliding portion and the connecting portion. Accordingly, when the brake pad is pressed against the sliding portion, the axial direction vibration is generated in the disc rotor which vibration has an antinode or loop of vibration formed at the low-rigidity portion. This results in the vibration having a large component in the direction of the rotational axis of the disc rotor. Accordingly, the vibration generated in the disc rotor tends to be transmitted to a caliper pressing the brake pad onto the disc rotor. This substantially increases a mass of the brake system and, thus, the generation of a brake noise is suppressed.

In one embodiment of the present invention, the low-rigidity portion may be formed by an annular groove formed along the substantial boundary between the sliding portion and the connecting portion.

The low-rigidity portion may be formed by a first annular groove and a second annular groove, the first annular groove being formed on one side of the disc rotor and the second annular groove being formed on the other side of the disc rotor so that the low-rigidity portion is formed between the first annular groove and the second annular groove.

Additionally, the disc rotor according to the present invention may further comprise a plurality of ribs provided to an outer surface of the hat portion, an end of each of the ribs being connected to the connecting portion. The ribs may be integral with the hat portion and the connecting portion.

Other objects, features and advantages of the present invention will become more apparent from the following detailed description when read in conjunction with the accompanying drawings.

DETAILED DESCRIPTION OF THE PREFERRED EMBODIMENTS

Figure 1:
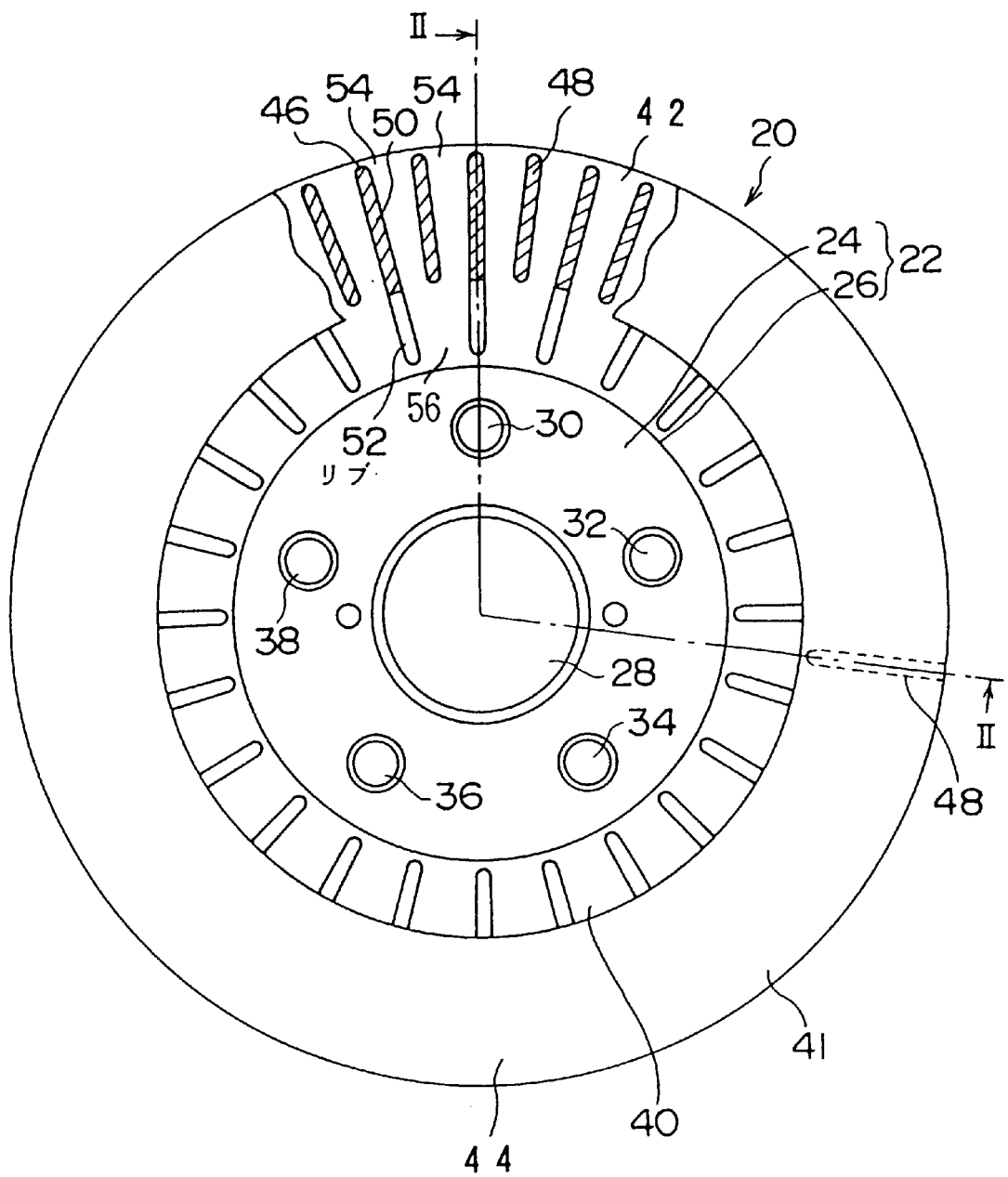
FIG. 1 is a front view of a disc rotor according to a first embodiment of the present invention.
Figure 2:
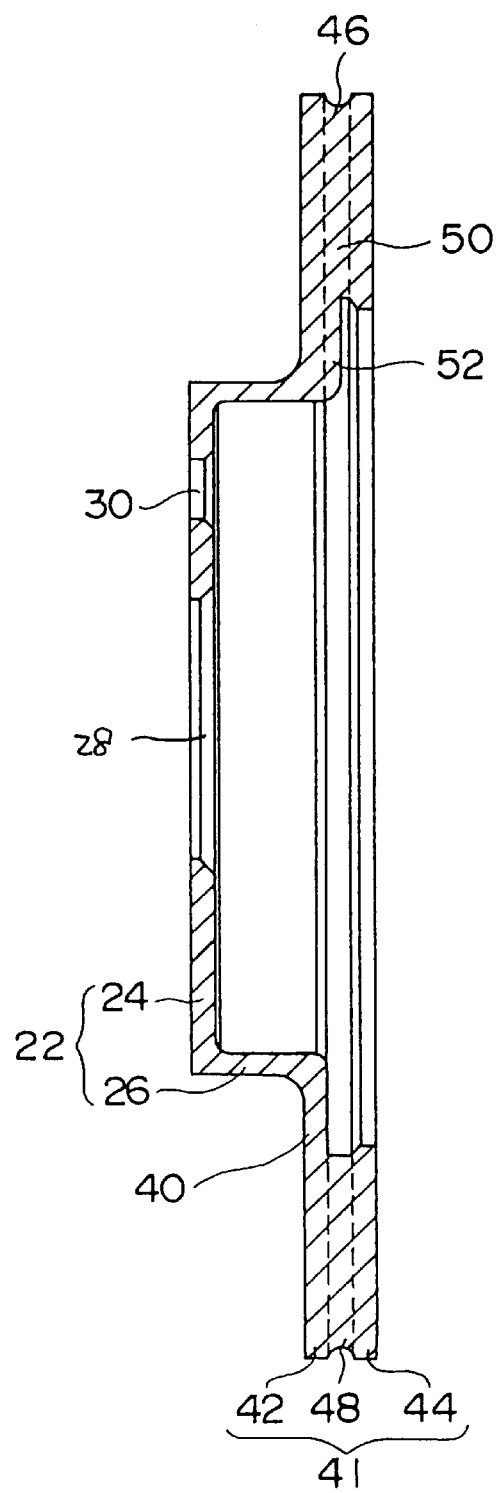
FIG. 2 is a cross-sectional view of the disc rotor shown FIG. 1 taken along a line II—II of FIG. 1.

A description will now be given, with reference to FIGS. 1 and 2, of a disc rotor 20 according to a first embodiment of the present invention. FIG. 1 is a front view of the disc rotor. FIG. 2 is a cross-sectional view of the disc rotor 20 taken along a line II—II of FIG. 1. The disc rotor 20 according to the present embodiment is a ventilated-type disc rotor.

As shown in FIGS. 1 and 2, the disc rotor 20 includes a hat portion 22. The hat portion 22 comprises a disc-like flat portion 24 and a cylindrical portion 26. The flat portion 24 and the cylindrical portion 26 are integrally formed with each other. The flat portion 24 has a through opening 28 at the center thereof. The flat portion 24 also has five bolt holes 30, 32, 34, 36 and 38 which surround the through opening 28 at equal intervals.

The hat portion 22 is fixed to an axle hub not shown in the figures. The axle hub is a member for rotatably supporting a wheel with respect to a vehicle body. The axle hub is fixed to a suspension arm via a bearing. When the disc rotor 20 is fixed to the axle hub, the disc rotor is also rotatable together with the wheel.

An annular sliding portion 41 is fixed to the cylindrical portion 26 of the hat portion 22 via a connecting portion 40. The annular sliding portion 41 includes a first plate 42 which is connected to the connecting portion 40. A second plate 44 is provided opposite to the first plate 42 with a plurality of long fins 46 and a plurality of short fins 48 therebetween. That is, the second plate 44 is connected to the first plate via the long fins 46 and the short fins 48. The long fins 46 and the short fins 48 extend in radial directions of the disc rotor 20. The long fins 46 and the short fins 48 are arranged alternatively with equal intervals.

Each of the long fins 46 comprises a fin portion 50 and a rib portion 52. The height of the fin portion 50, which is measured in the axial direction of the disc rotor 20, is equal to the height of the short fin 48. The height of the rib portion 52 is slightly less than the height of the fin portion 50. The first plate 42 and the second plate 44 are fixed to each other by the fin portions 50 of the long fins 46 and the short fins 48. The rib portions 52 extend radially inwardly from the fin portions 50 so that ends of the rib portions 52 are positioned adjacent to an inner side of the connecting portion 40.

In a case where the rib portions 52 are provided to the connecting portion 40 as mentioned above, the rigidity of the connecting portion 40 is increased as compared to a case where the rib portions 52 are not provided. Accordingly, in the disc rotor 20, a high rigidity is provided between the sliding portion 41 and the hat portion 22.

As shown in FIG. 1, a plurality of ventilation passages 54 are formed by the long fins 46 and the short fins 48 between the first plate 42 and the second plate 44. Additionally, a ventilation passage opening 56 is formed between adjacent rib portions 52. The ventilation passages 54 formed on opposite sides of one short fin 48 are connected to the respective ventilation passage openings 56.

When air flows through the ventilation passages 54, the cooling efficiency of the disc rotor 20 is increased. Accordingly, a higher cooling efficiency is provided as an air flow is easily formed in the ventilation passages 54. In this respect, since the disc rotor 20 according to the present embodiment is provided with the long fins 46 and the short fins 48 which are alternatively arranged, an air flow is easily formed through the ventilation passage 54 as compared to a case where all fins are the long fins 46. Accordingly, the disc rotor 20 has a cooling efficiency higher than a disc rotor having only the long fins 46.

Figure 3:
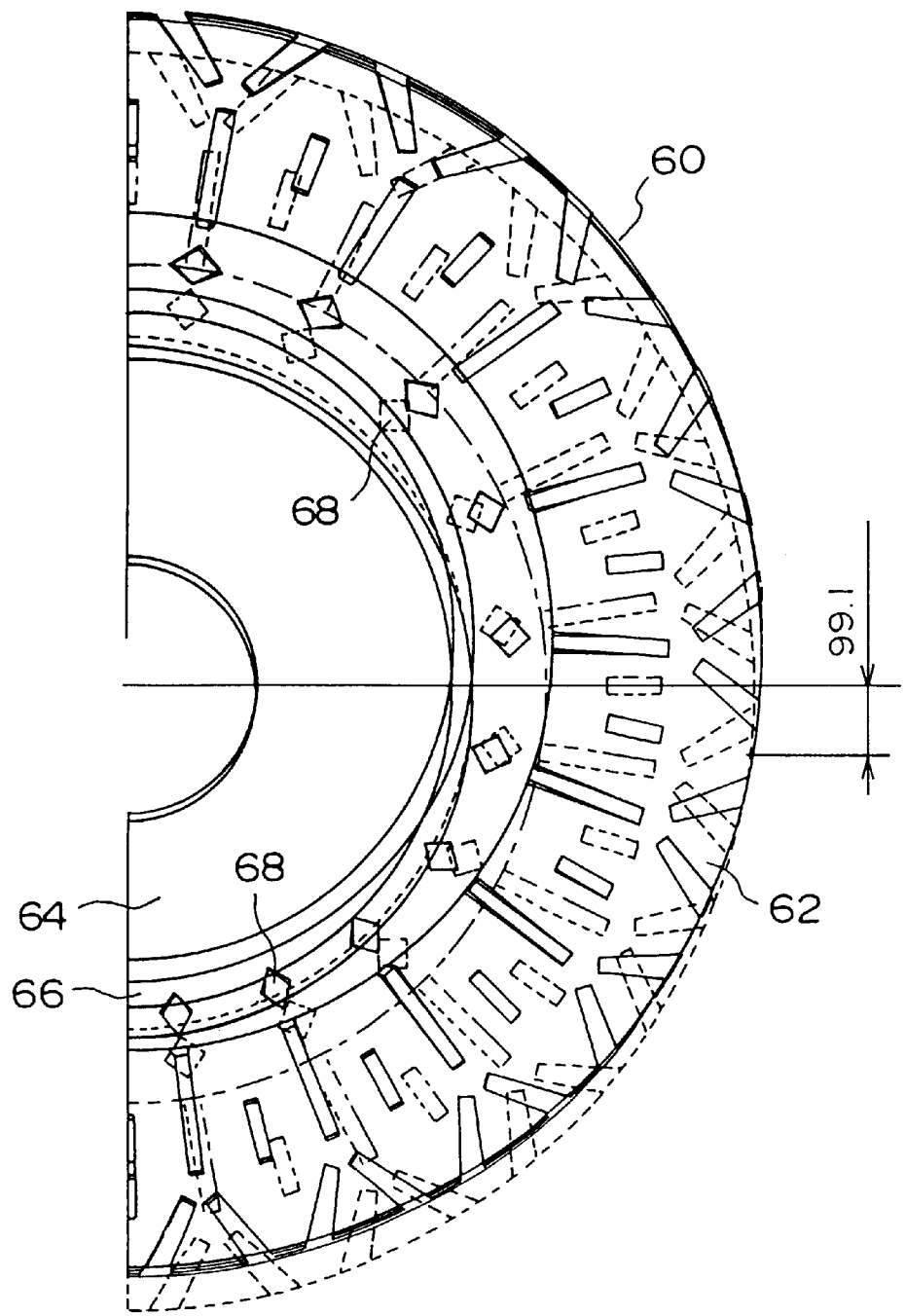
FIG. 3 is an illustration showing a result of a finite lement method (FEM) analysis performed on a sample disc otor to analyze in-plane vibration.

A description will now be given, with reference to FIGS. 3 to 7, of a feature of the disc rotor 20. FIG. 3 is an illustration showing a result of a finite element method (FEM) analysis performed for analyzing behavior of in-plane vibration generated in a disc rotor 60 when brake pads are pressed against the disc rotor 60 with a predetermined force. The disc rotor 60 is a sample disc rotor which is compared with the disc rotor 20 according to the present embodiment. The disc rotor 60 does not have rib portions in a connecting portion 66 located between a sliding portion 62 and a hat portion 64. It should be noted that, in FIG. 3, fins formed within the disc rotor are illustrated.

Figures illustrated by dashed lines in FIG. 3 represent a state before the brake pads are pressed against the disc rotor 60. That is, the dashed lines represent a state before the in-plane vibration is generated in the disc rotor 60. Figures illustrated by solid lines in FIG. 3 represent a state when the brake pads are pressed against the disc rotor 60. That is, the solid lines represent a state when the in-plane vibration is generated in the disc rotor 60.

In FIG. 3, diamond shapes 68 illustrated by dashed lines are elongated in a transverse direction on the upper side of FIG. 3. On the other hand, on the lower side of FIG. 3, the diamond shapes 68 are elongated in a longitudinal direction. The diamond shapes 68 are deformed when compression and decompression are generated in a local area of the disc rotor 60 which are caused by the in-plane vibration generated in the disc rotor 60. That is, FIG. 3 shows the disc rotor 60 in a state where the upper portion is decompressed and the lower portion is compressed.

The number "99.1" indicated in FIG. 3 is a characteristic value which represents a magnitude of deformation generated in a local area of the disc rotor 60 due to vibration generated in the disc rotor 60. That is, in FIG. 3, a deformation corresponding to the characteristic value "99.1" is generated in the disc rotor 60.

Figure 4:
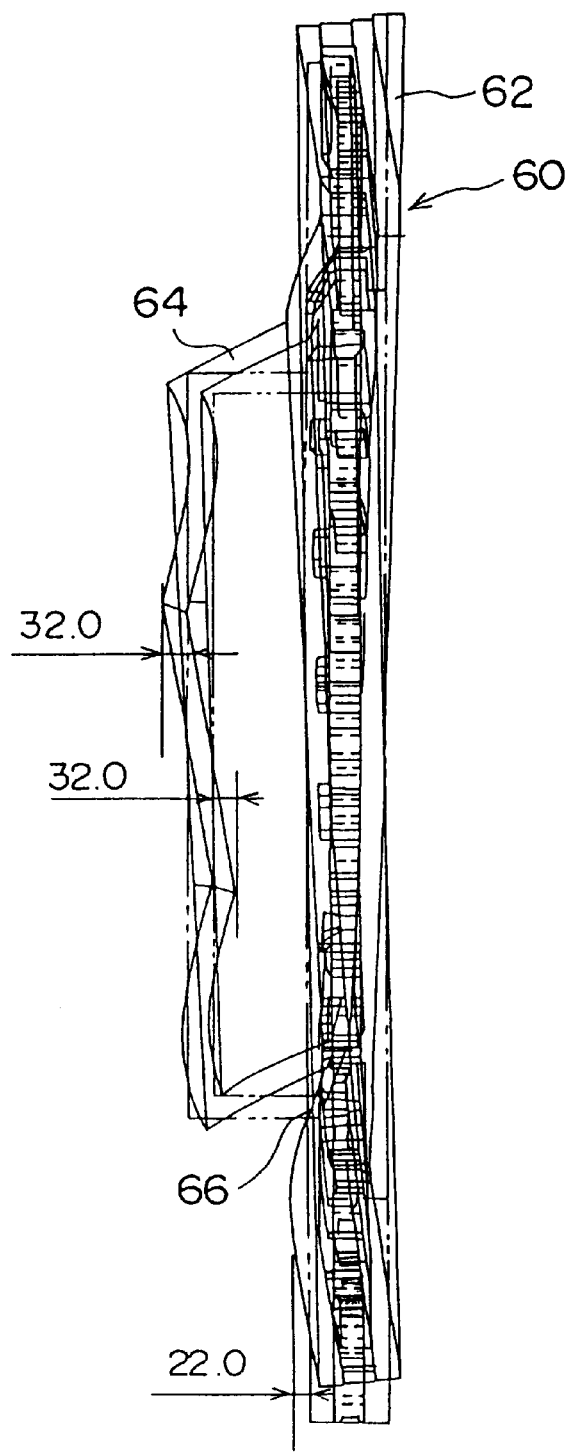
FIG. 4 is an illustration showing a result of a finite element method (FEM) analysis performed on a sample disc rotor to analyze axial direction vibration.

FIG. 4 is an illustration showing a result of a finite element method (FEM) analysis performed for analyzing behavior of the axial direction vibration generated in the disc rotor 60 when the brake pads are pressed against the disc rotor 60 with a predetermined force. It should be noted that, similar to FIG. 3, the fins formed within the disc rotor 60 are shown in FIG. 4.

Figures illustrated by dashed lines in FIG. 4 represent a state before the brake pads are pressed against the disc rotor 60. That is, the dashed lines represent a state before the axial direction vibration is generated in the disc rotor 60. Figures illustrated by solid lines in FIG. 4 represent a state when the brake pads are pressed against the disc rotor 60. That is, the solid lines represent a state when the axial direction vibration is generated in the disc rotor 60.

The numbers "22.0" and "32.0" shown in FIG. 4 are characteristic values representing magnitudes of an axial deformation generated in the sliding portion 62 and the hat portion 64 of the disc rotor 60, respectively. That is, in FIG. 4, an axial deformation corresponding to the characteristic value "22.0" is generated in the sliding portion 62 of the disc rotor 60, and an axial deformation corresponding to the characteristic value "32.0" is generated in the hat portion 64 of the disc rotor 60.

Figure 5:
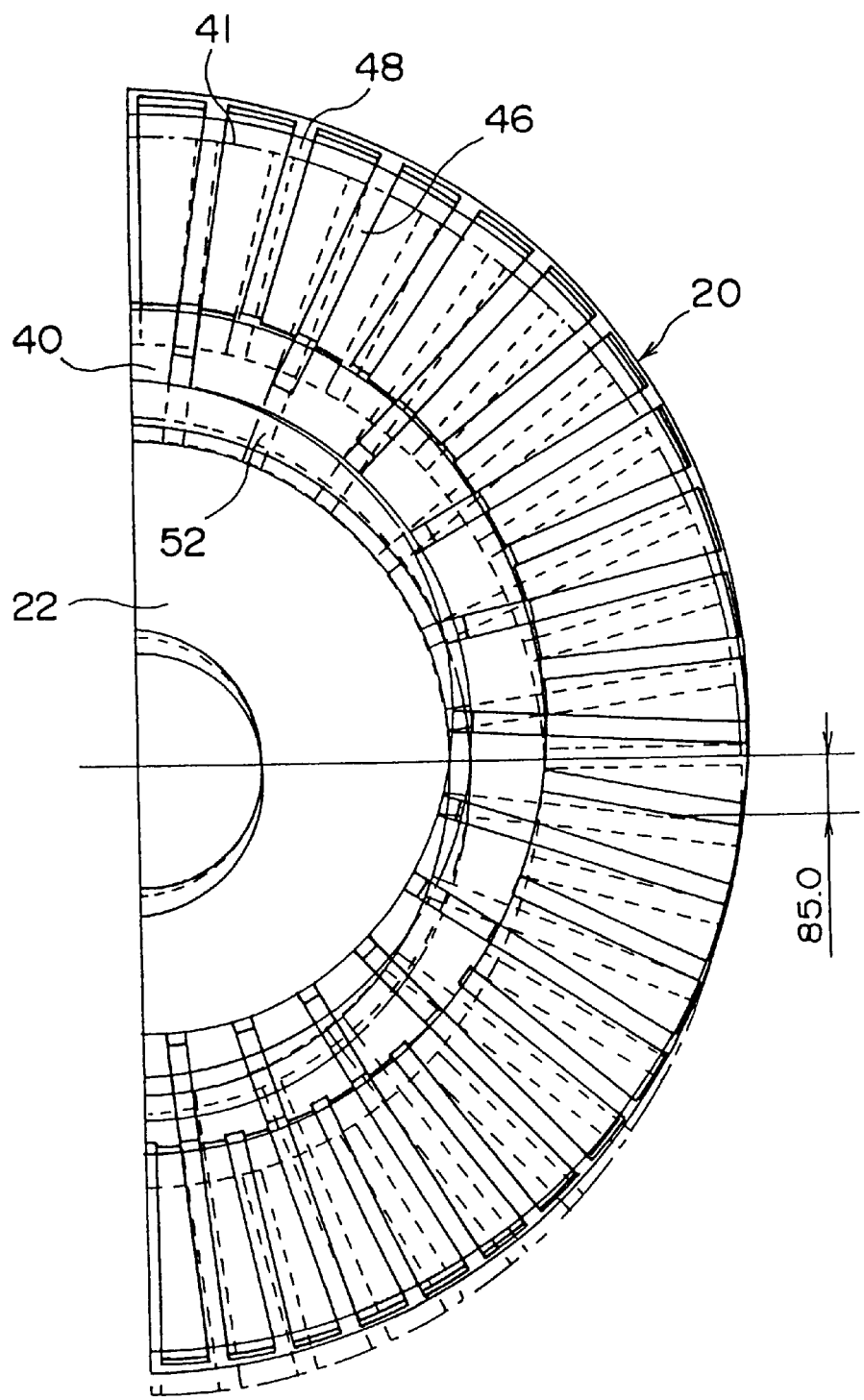
FIG. 5 is an illustration showing a result of a finite element method (FEM) analysis performed on the disc rotor shown in FIG. 1 to analyze in-plane vibration.

FIG. 5 is an illustration showing a result of a finite element method (FEM) analysis performed for analyzing behavior of in-plane vibration generated in the disc rotor 20 when the brake pads are pressed against the disc rotor 20 with a predetermined force. It should be noted that, in FIG. 5, the long fins 46 and the short fins 48 formed within the disc rotor 20 are illustrated.

Figures illustrated by dashed lines in FIG. 5 represent a state before the brake pad is pressed against the disc rotor 20. That is, the dashed lines represent a state before in-plane vibration is generated in the disc rotor 20. Figures illustrated by solid lines in FIG. 5 represent a state when the brake pad is pressed against the disc rotor 20. That is, the solid lines represent a state when the in-plane vibration is generated in the disc rotor 20.

The number "85.5" indicated in FIG. 5 is a characteristic value which represents a magnitude of deformation generated a local area of the disc rotor 20 due to vibration generated in the disc rotor 20. That is, in FIG. 5, a deformation corresponding to the characteristic value "85.5" is generated in the disc rotor 20.

Figure 6:
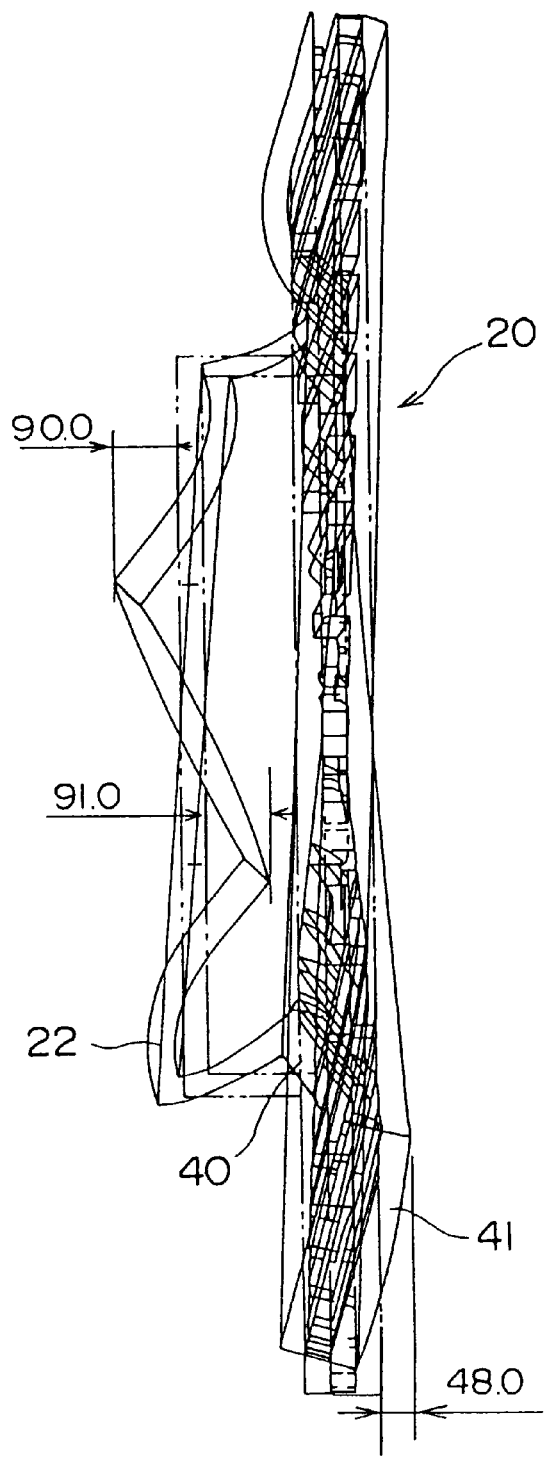
FIG. 6 is an illustration showing a result of a finite element method (FEM) analysis performed on the disc rotor shown in FIG. 1 to analyze axial direction vibration.

FIG. 6 is an illustration showing a result of a finite element method (FEM) analysis performed for analyzing behavior of axial direction vibration generated in the disc rotor 20 when the brake pads are pressed against the disc rotor 20 with a predetermined force. It should be noted that, similar to FIG. 5, the long fins 46 and the short fins 48 formed within the disc rotor 20 are shown in FIG. 6.

Figures illustrated by dashed lines in FIG. 6 represent a state before the brake pads are pressed against the disc rotor 20. That is, the dashed lines represent a state before the axial direction vibration is generated in the disc rotor 20. Figures illustrated by solid lines in FIG. 6 represent a state when the brake pads are pressed against the disc rotor 20. That is, the solid lines represent a state when the axial direction vibration is generated in the disc rotor 20.

The number "48.0" shown in FIG. 6 is a characteristic value representing a magnitude of a deformation generated in the sliding portion 41 of the disc rotor 20. Additionally, the numbers "90.0" and "91.0" shown in FIG. 6 are characteristic values representing magnitudes of deformation generated in the hat portion 22 of the disc rotor 20. That is, in FIG. 6, an axial deformation corresponding to the characteristic value "48.0" is generated in the sliding portion 41 of the disc rotor 20, and axial deformations corresponding to the characteristic values "90.0" and "91.0" are generated in the hat portion 22 of the disc rotor 20.

Figure 7:
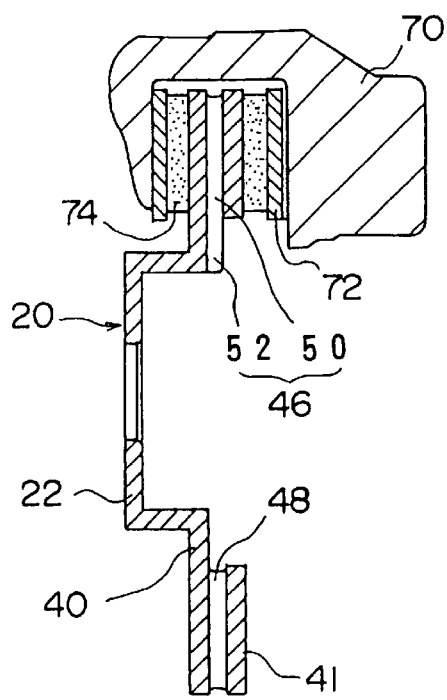
FIG. 7 is a cross-sectional view of the disc rotor shown in FIG. 1 and a caliper.

FIG. 7 is a cross-sectional view of the disc rotor 20 and a caliper 70 for explaining a positional relationship therebetween. As mentioned above, the disc rotor 20 is rotatably mounted to the vehicle body via the axle hub. On the other hand, the caliper 70 is mounted to the vehicle body so that the caliper 70 can be displaced by a predetermined distance in the axial direction of the disc rotor 20. As shown in FIG. 7, the caliper 70 holds brake pads 72 and 74.

The brake pads 72 and 74 are provided on opposite sides of the sliding portion 41 of the disc rotor 20. The caliper 70 has a hydraulic cylinder which presses the brake pad 72. When a hydraulic pressure is introduced into the hydraulic cylinder, the brake pad 72 contacts one side (right side surface in FIG. 7) of the sliding portion 41 of the disc rotor 20.

When the brake pad 72 contacts the sliding portion 41 of the disc rotor 20, the caliper 70 moves in the right direction in FIG. 7. As a result, the brake pad 74 contacts the other side (left side surface in FIG. 7) of the disc rotor 20. When both the brake pads 72 and 74 are pressed against the disc rotor 20, a frictional force is generated between the disc rotor 20 and each of the brake pads 72 and 74. The frictional force acts as a force for restricting rotation of the disc rotor 20. That is, the frictional force acts as a brake force for restricting rotation of the wheel. Additionally, a magnitude of the frictional force generated between the disc rotor 20 and each of the brake pads 72 and 74 is in response to the magnitude of the hydraulic pressure introduced into the hydraulic cylinder. That is, the frictional force corresponds to a depression force applied to a brake pedal. Accordingly, the disc brake apparatus having the disc rotor 20 and the caliper 70 generates a brake force corresponding to a depression force applied to a brake pedal.

The deformation of the disc rotor 60 shown in FIGS. 3 and 4 and the deformation of the disc rotor 20 shown in FIGS. 5 and 6 are the results obtained from the same pressing force applied by the brake pads. As shown in FIGS. 3 and 5, the amount of deformation caused by the in-plane vibration in the disc rotor 20 is slightly smaller than the amount of deformation caused by the in-plane vibration in the disc rotor 60. Accordingly, the disc rotor 20 having the rib portions 52 in the connecting portion 40 has a superior characteristic over the disc rotor 60 having no rib portion in the connecting portion 60 with respect to reduction of the in-plane vibration due to a braking operation.

Additionally, as shown in FIGS. 4 and 6, the amount of deformation due to the axial direction vibration in the disc rotor 20 is much larger than the amount of deformation due to the axial direction vibration in the disc rotor 60. When the axial direction vibration is generated in the disc rotor 20, the vibration is transmitted to the caliper 70 via the brake pads 72 and 74. Thus, the caliper 70 also vibrates in the axial direction of the disc rotor 20.

When the caliper 70 vibrates together with the disc rotor 20, the mass of the vibration system is greater than the mass of the vibration system which includes only the disc rotor 20. The vibration in a vibration system attenuates faster as the mass of the vibration system is larger. Accordingly, in order to attenuates the vibration in the disc rotor 20, it is better that the vibration in the disc rotor 20 be efficiently transmitted to the caliper 70.

The vibration generated in the disc rotor 20 is more easily transmitted as the vibration has a larger component in the axial direction of the disc rotor 20. As mentioned above, the vibration generated in the disc rotor 20, which has a high rigidity in the connecting portion 40, has a large component in the axial direction. Accordingly, the vibration generated in the disc rotor 20 is more easily transmitted to the caliper 70 than the vibration generated in the disc rotor 60. Thus, according to the disc rotor 20, the vibration due to a braking operation can be attenuated in a shorter time as compared to the vibration generated in the disc rotor 60.

As mentioned above, according to the disc rotor 20 of the present embodiment, the generation of a brake noise may can be effectively suppressed.

A description will now be given, with respect to FIGS. 8 to 12, of second to sixth embodiments of the present invention. In FIGS. 8 to 12, parts that are the same as the parts shown in FIGS. 1 and 2 are given the same reference numerals, and descriptions thereof will be omitted.

Figure 8:
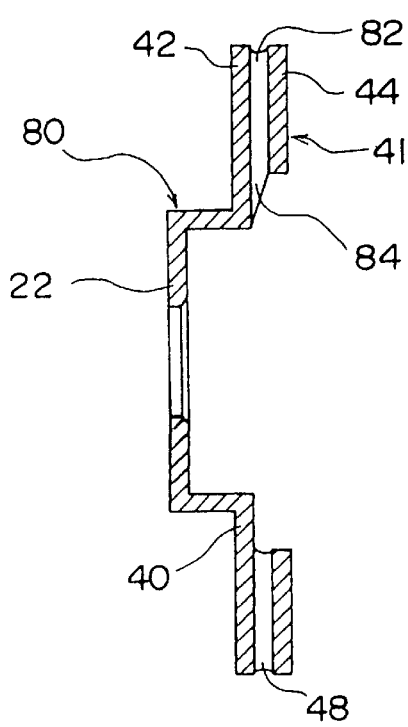
FIG. 8 is a cross-sectional view of a disc rotor according to a second embodiment of the present invention.

FIG. 8 is a cross-sectional view of a disc rotor 80 according to the second embodiment of the present invention. The disc rotor 80 according to the present embodiment is a ventilated-type disc rotor.

The disc rotor 80 includes long fins 82 in addition to the short fins 48 in the location between the first plate 42 and the second plate 44. Each of the long fins 82 includes a rib portion 84 on the inner end portion thereof. The rib portion 84 is integrally formed with the connecting portion 40, and the height of the rib portion 84 is gradually decreased toward the inner side of the disc rotor 80. It should be noted that the height of the rib portion 84 is measured in the axial direction of the disc rotor 80.

According to the above-mentioned construction, the connecting portion 40 of the disc rotor 80 has a high rigidity similar to the disc rotor 20 according to the first embodiment. Thus, a generation of a brake noise can also be suppressed by the disc rotor 80 according to the present embodiment. Additionally, the disc rotor 80 can be made lighter than the disc rotor 20 since the volume of the rib portions 84 is reduced as compared to that of the rib portions 50 of the disc rotor 20.

Figure 9:
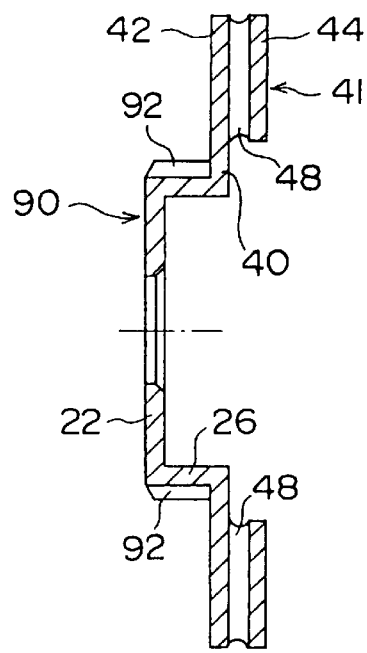
FIG. 9 is a cross-sectional view of a disc rotor according to a third embodiment of the present invention.

FIG. 9 is a cross-sectional view of a disc rotor 90 according to the third embodiment of the present invention. The disc rotor 90 according to the present embodiment is a ventilated-type disc rotor.

The disc rotor 90 includes the short fins 48 between the first plate 42 and the second plate 44. Additionally, the disc rotor 90 is provided with a plurality of rib portions 92 on the outer surface of the cylindrical portion 26 of the hat portion 22. The rib portions 92 increase a rigidity of the connecting portion 40. According to the above-mentioned structure of the disc rotor 90, a high rigidity can be provided to the connecting portion 40 similar to the disc rotor 20 according to the first embodiment. Thus, the disc rotor 90 according to the present embodiment also suppresses generation of a brake noise.

Figure 10:
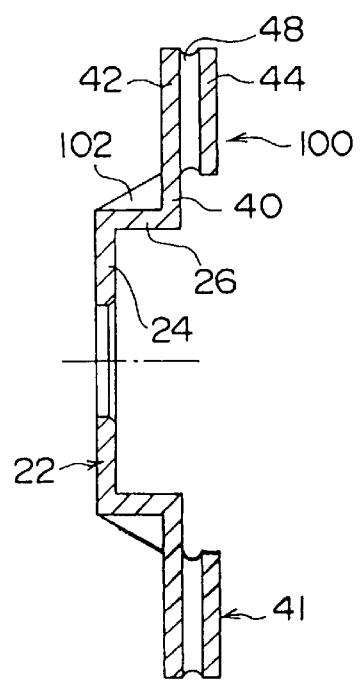
FIG. 10 is a cross-sectional view of a disc rotor according to a fourth embodiment of the present invention.

FIG. 10 is a cross-sectional view of a disc rotor 100 according to the fourth embodiment of the present invention. The disc rotor 100 according to the present embodiment is a ventilated-type disc rotor.

The disc rotor 100 includes the short fins 48 between the first plate 42 and the second plate 44. Additionally, the disc rotor 100 is provided with a plurality of rib portions 102 on the outer surface of the cylindrical portion 26 of the hat portion 22. The height of each of the rib portions 102 is decreased from the connecting portion 40 to the flat portion 24 of the hat portion 22. The height of the rib portion is measured in the radial direction of the disc rotor 100. The rib portions 102 increase a rigidity of the connecting portion 40. According to the above-mentioned structure of the disc rotor 90, a high rigidity can be provided to the connecting portion 40. Thus, the disc rotor 100 according to the present embodiment also suppresses generation of a brake noise.

Figure 11:
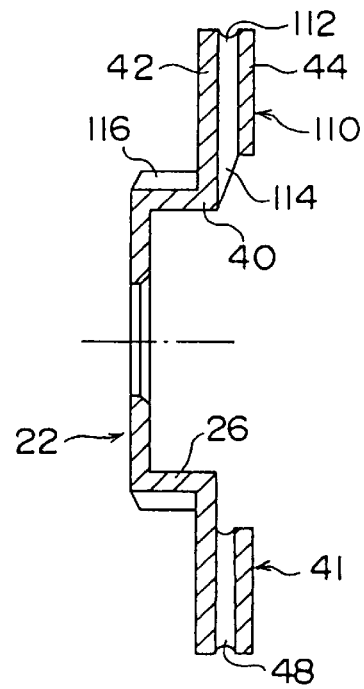
FIG. 11 is a cross-sectional view of a disc rotor according to a fifth embodiment of the present invention.

FIG. 11 is a cross-sectional view of a disc rotor 110 according to the fifth embodiment of the present invention. The disc rotor 110 according to the present embodiment is a ventilated-type disc rotor.

The disc rotor 110 includes long fins 112 in addition to the short fins 48 between the first plate 42 and the second plate 44. Each of the long fins 112 includes a rib portion 114 on the inner end thereof. The height of the rib portion 114 is decreased toward the inner side of the disc rotor 110, the height being measured in the axial direction of the rotor 110. Additionally, the disc rotor 110 is provided with a plurality of rib portions 116 on the outer surface of the cylindrical portion 26 of the hat portion 22. The rib portions 116 increase a rigidity of the connecting portion 40. According to the above-mentioned structure of the disc rotor 110, a higher rigidity can be provided to the connecting portion 40 than the disc rotor 20 according to the first embodiment. Thus, the disc rotor 110 according to the present embodiment also suppresses generation of a brake noise.

Figure 12:
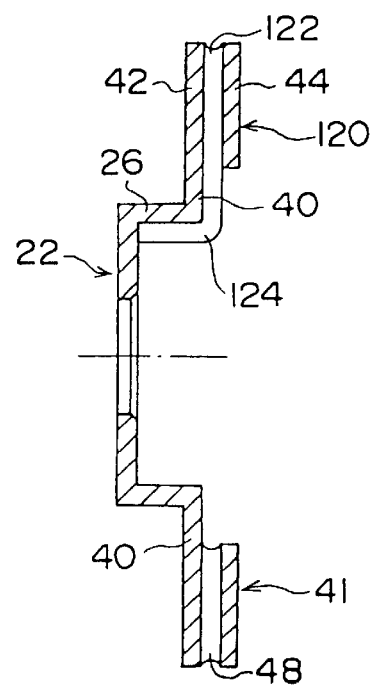
FIG. 12 a cross-sectional view of a disc rotor according to a sixth embodiment of the present invention.

FIG. 12 is a cross-sectional view of a disc rotor 120 according to the sixth embodiment of the present invention. The disc rotor 120 according to the present embodiment is a ventilated-type disc rotor.

The disc rotor 120 includes a plurality of long fins 122 in addition to the short fins 48 between the first plate 42 and the second plate 44. Each of the long fins 122 includes a rib portion 124 on the inner end thereof. The rib portion 124 comprises a portion extending on the connecting portion 40 in a radial direction of the disc 120 and a portion extending on an inner side of the cylindrical portion 26 of the hat portion 22 in the axial direction of the disc rotor 120. According to the above-mentioned structure of the disc rotor 120, a higher rigidity can be provided to the connecting portion 40 than the disc rotor 20 according to the first embodiment. Thus, the disc rotor 120 according to the present embodiment also suppresses generation of a brake noise.

Figure 13:
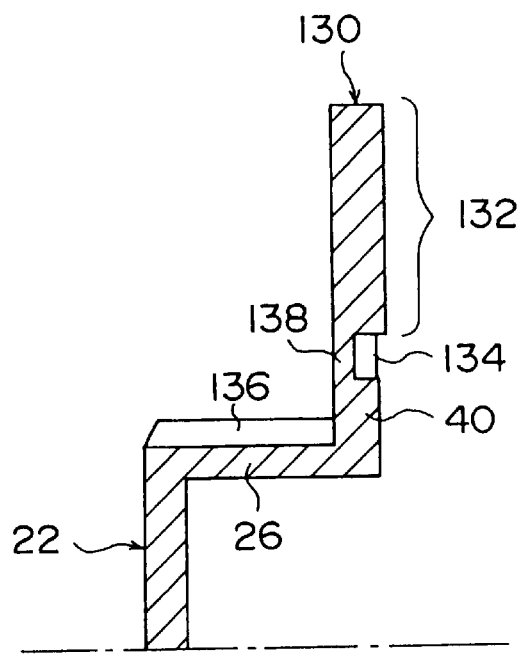
FIG. 13 is a cross-sectional view of a half part of a disc rotor according to a seventh embodiment of the present invention.
Figure 14:
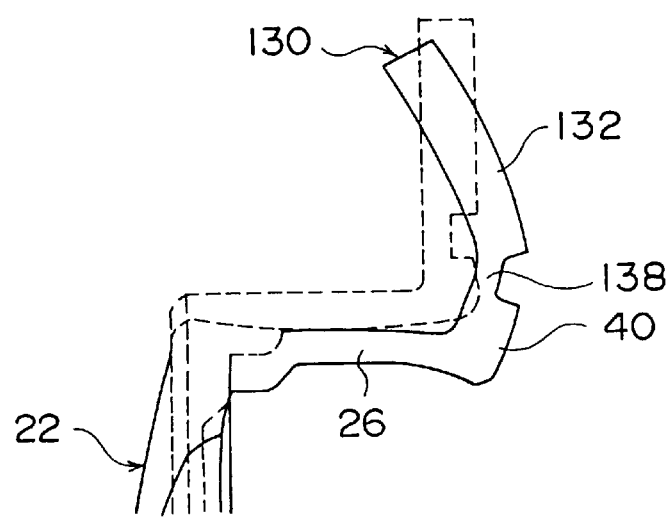
FIG. 14 is an illustration showing a result of a finite element method (FEM) analysis to analyze behavior of axial direction vibration generated in the disc rotor shown in FIG. 13.

A description will now be given, with reference to FIGS. 13 and 14, of a seventh embodiment according to the present invention. In FIGS. 13 and 14, parts that are the same as the parts shown in FIGS. 1 and 2 are given the same reference numerals, and descriptions thereof will be omitted.

FIG. 13 is a cross-sectional view of a half part of a disc rotor 130 according to the seventh embodiment of the present invention. The disc rotor 130 is a solid-type disc rotor.

The disc rotor 130 includes an annular sliding portion 132 on the outer side of the connecting portion 40. An annular groove 134 is provided along a boundary between the connecting portion 40 and the sliding portion 132. Additionally, the disc rotor 130 has a plurality of rib portions 136 on the outer surface of the cylindrical portion 26 of the hat portion 22. Accordingly, the disc rotor 130 has a high rigidity in the connecting portion 40, and a low-rigidity portion 138 having a rigidity lower than a rigidity of the surrounding portions is formed between the sliding portion 132 and the connecting portion 40.

FIG. 14 is an illustration showing a result of a finite element method (FEM) analysis performed for analyzing behavior of axial direction vibration generated in the disc rotor 130 when the brake pads are pressed against the disc rotor 130 with a predetermined force. It should be noted that, a figure illustrated by dashed lines in FIG. 14 represents a state before the brake pads are pressed against the disc rotor 130. That is, the dashed lines represent a state of the disc rotor 130 before the axial direction vibration is generated in the disc rotor 130. A figure illustrated by solid lines in FIG. 14 represents a state of the disc rotor 130 when the brake pads are pressed against the disc rotor 130. That is, the solid lines represent a state of the disc rotor 130 when the axial direction vibration is generated in the disc rotor 130.

As mentioned above, the disc rotor 130 has a high rigidity in the connecting portion 40. Thus, the disc rotor 130 tends to generate the axial direction vibration when the brake pads are pressed thereon. Additionally, the disc rotor 130 has the low-rigidity portion 138 along the boundary between the connecting portion 40 and the sliding portion 132. The low-rigidity portion 138 can be more easily deformed than surrounding portions. Accordingly, when the axial direction vibration is generated in the disc rotor 130, the low-rigidity portion 138 provides a large displacement as an antinode or loop of vibration.

When the low-rigidity portion 138 moves as an antinode or loop of vibration, the axial direction vibration in the disc rotor 130 is efficiently transmitted to the caliper 70. Thus, according to the disc rotor 130 of the present invention, the vibration related to the brake pads being pressed against the disc rotor 130 can be attenuated in a short time, resulting in a suppression of a brake noise.

A description will now be given, with reference to FIGS. 15 to 18, of eighth to eleventh embodiments according to the present invention. In FIGS. 15 to 18, parts that are the same as the parts shown in FIGS. 1 and 2 are given the same reference numerals, and descriptions thereof will be omitted.

Figure 15:
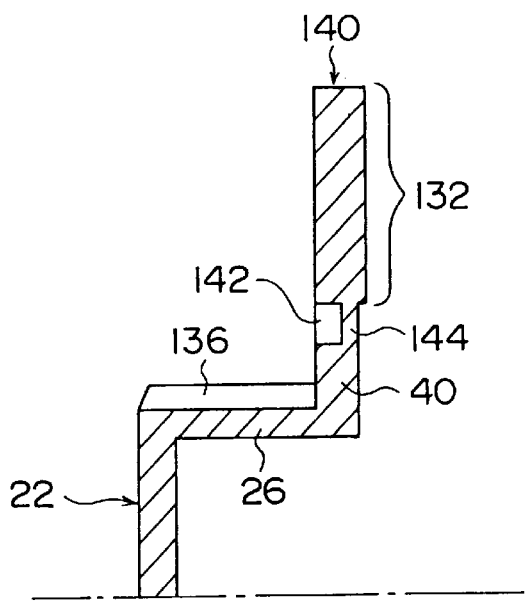
FIG. 15 is a cross-sectional view of a half part of a disc rotor according to an eighth embodiment of the present invention.

FIG. 15 is a cross-sectional view of a half part of a disc rotor 140 according to the eighth embodiment of the present invention. The disc rotor 140 according to the present embodiment is a solid-type disc rotor.

The disc rotor 140 has rib portions 136 on the outer surface of the cylindrical portion 26 similar to the disc rotor 130 shown in FIG. 13. The disc rotor 140 also has a low-rigidity portion 144 and an annular groove 142 along a boundary between the connecting portion 40 and the sliding portion 132. In the present embodiment, the annular groove 142 is provided so that the annular groove 142 opens toward the side of the hat portion 22. According to the disc rotor 140, similar to the disc rotor 130 shown in FIG. 13, the low-rigidity portion 144 can be displaced as an antinode or loop of vibration. Thus, according to the disc rotor 140, a brake noise can be efficiently suppressed similar to the disc rotor 130 shown in FIG. 13.

Figure 16:
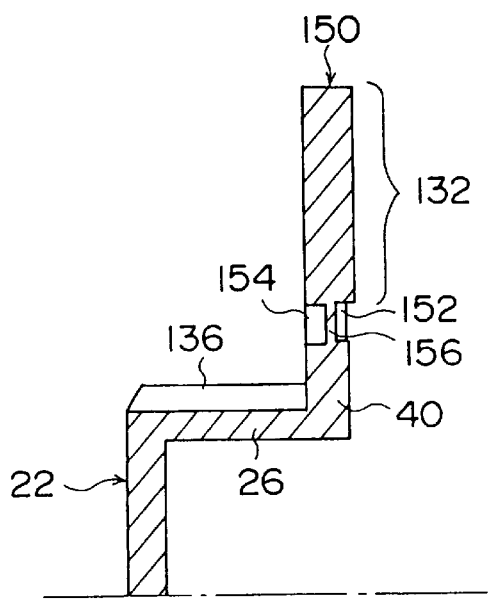
FIG. 16 is a cross-sectional view of a half part of a disc rotor according to a ninth embodiment of the present invention.

FIG. 16 is a cross-sectional view of a half part of a disc rotor 150 according to the ninth embodiment of the present invention. The disc rotor 150 according to the present embodiment is a solid-type disc rotor.

The disc rotor 150 has the rib portions 136, and also has annular grooves 152 and 154 along the boundary of the sliding portion 132 and the connecting portion 40. The annular grooves 152 and 154 are formed on opposite sides of the disc rotor 150 so that a low-rigidity portion 156 is formed between the annular grooves 152 and 154. Accordingly, the low-rigidity portion 156 can be displaced as an antinode or loop of vibration when brake pads are pressed against the sliding portion 132 of the disc rotor 150. Thus, the disc rotor 150 of the present embodiment can suppress a brake noise similar to the disc rotor 130 shown in FIG. 13.

Figure 17:
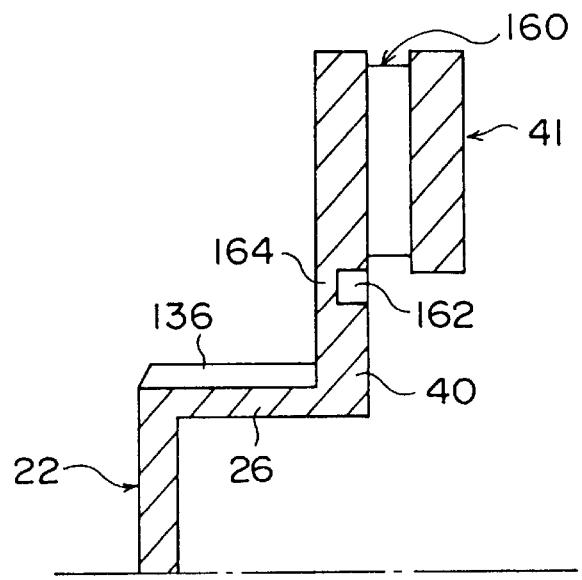
FIG. 17 is a cross-sectional view of a half part of a disc rotor according to a tenth embodiment of the present invention.

FIG. 17 is a cross-sectional view of a half part of a disc rotor 160 according to the tenth embodiment of the present invention. The disc rotor 160 according to the present embodiment is a ventilated-type disc rotor.

The disc rotor 160 has the rib portions 136 on the outer surface of the cylindrical portion 26, and also has an annular groove 162 along the boundary of the first plate 42 of the sliding portion 41 and the connecting portion 40. The annular groove 162 is formed so as to provide a low-rigidity portion 164 formed between the sliding portion 41 and the connecting portion 40. Accordingly, the low-rigidity portion 164 can be displaced as an antinode or loop of vibration when brake pads are pressed against the sliding portion 41 of the disc rotor 160. Thus, according to the disc rotor 160 of the present embodiment can suppress a brake noise similar to the disc rotor 130 shown in FIG. 13.

Figure 18:
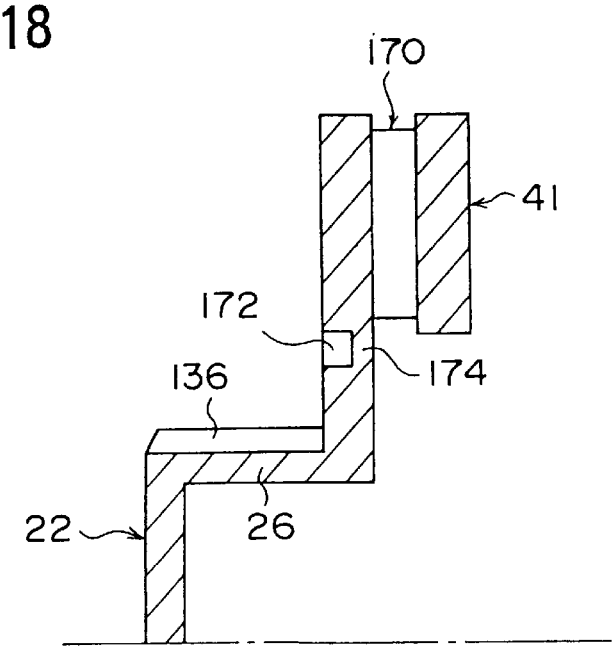
FIG. 18 is a cross-sectional view of a half part of a disc rotor according to an eleventh embodiment of the present invention.

FIG. 18 is a cross-sectional view of a half part of a disc rotor 170 according to the eleventh embodiment of the present invention. The disc rotor 170 according to the present embodiment is a ventilated type disc rotor.

The disc rotor 170 has the rib portions 136 on the outer surface of the cylindrical portion 26, and also has an annular groove 172 along the boundary of the first plate 42 of the sliding portion 41 and the connecting portion 40. In the present embodiment, the annular groove 172 opens to the side of the hat portion 22. The annular groove 172 is formed so as to provide a low-rigidity portion 174 formed between the sliding portion 41 and the connecting portion 40. Accordingly, the low-rigidity portion 174 can be displaced as an antinode or loop of vibration when brake pads are pressed against the sliding portion 41 of the disc rotor 170. Thus, the disc rotor 170 of the present embodiment can suppress a brake noise similar to the disc rotor 130 shown in FIG. 13.

The present invention is not limited to the specifically disclosed embodiments, and variations and modifications may be made without departing from the scope of the present invention.

What is claimed is:

1. A disc rotor of a disc brake for a vehicle, comprising:

a hat portion adapted to be fixed to an axle hub of a vehicle;

a sliding portion adapted to be pressed by a brake pad so as to generate a brake force;

a connecting portion extending radially from said hat portion and connecting said sliding portion to said hat portion;

a permanent low-rigidity portion provided substantially along a boundary between said sliding portion and said connecting portion, said low-rigidity portion having a rigidity lower than a rigidity of each of said sliding portion and said connecting portion so that said low-rigidity portion forms an antinode of vibration; and a plurality of ribs provided on an outer surface of said hat portion, an end of each of said ribs connected to said connecting portion;

wherein said plurality of ribs increase rigidity of said connecting portion to reduce in-plane vibration of said disc rotor and to increase axial vibration of said disc rotor.

2. The disc rotor as claimed in claim 1, wherein said low-rigidity portion is formed by an annular groove formed on one side of said disc rotor substantially along the boundary between said sliding portion and said connecting portion.

3. The disc rotor as claimed in claim 2, wherein said one side of said disc rotor is opposite said hat portion.

4. The disc rotor as claimed in claim 2, wherein said one side of said disc rotor is adjacent to said hat portion.

5. The disc rotor as claimed in claim 1, wherein said low-rigidity portion is formed by a first annular groove and a second annular groove, said first annular groove being formed on one side of said disc rotor and said second annular groove being formed on the other side of said disc rotor so that said low-rigidity portion is formed between said first annular groove and said second annular groove.

6. The disc rotor as claimed in claim 1, wherein said ribs are integral with said hat portion and said connecting portion.

* * * * *